US009321440B2

(12) United States Patent
Perlick et al.

(10) Patent No.: US 9,321,440 B2
(45) Date of Patent: Apr. 26, 2016

(54) TRAILER HOLD ASSIST DURING STANDSTILL

(75) Inventors: Donald A. Perlick, Farmington Hills, MI (US); Anthony Joseph Rendi, Commerce Township, MI (US); Thomas Salmon, Rochester, MI (US); Jerry Alex James, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 798 days.

(21) Appl. No.: 13/293,942

(22) Filed: Nov. 10, 2011

(65) Prior Publication Data

US 2013/0124058 A1    May 16, 2013

(51) Int. Cl.
*B60T 7/20*    (2006.01)
*B60T 8/17*    (2006.01)
*B60T 8/24*    (2006.01)

(52) U.S. Cl.
CPC ............... *B60T 8/1708* (2013.01); *B60T 7/20* (2013.01); *B60T 8/24* (2013.01); *B60T 2201/06* (2013.01)

(58) Field of Classification Search
CPC ..... B60T 8/1708; B60T 8/323; B60T 15/041; B60W 2710/188
USPC ................... 701/70; 303/7, 123, 124
See application file for complete search history.

(56) References Cited

U.S. PATENT DOCUMENTS

| 6,499,814 | B1* | 12/2002 | Mixon .................... 303/124 |
| 6,652,038 | B1* | 11/2003 | Frye ........................ 303/7 |
| 8,182,050 | B2* | 5/2012 | Jackson et al. ........... 303/192 |
| 2003/0025387 | A1* | 2/2003 | Schmeling ............... 303/7 |
| 2006/0076827 | A1* | 4/2006 | Albright et al. .......... 303/123 |
| 2009/0082935 | A1* | 3/2009 | Leschuk et al. .......... 701/70 |
| 2010/0211279 | A1* | 8/2010 | Lingman et al. ......... 701/70 |
| 2010/0217495 | A1* | 8/2010 | Heise et al. ............. 701/70 |
| 2011/0042154 | A1* | 2/2011 | Bartel ..................... 180/11 |

* cited by examiner

*Primary Examiner* — Khoi Tran
*Assistant Examiner* — Ryan Rink
(74) *Attorney, Agent, or Firm* — Angela M. Brunetti; Raymond Coppiellie

(57) ABSTRACT

A vehicle comprises a speed-sensing device outputting a signal indicating a velocity of the vehicle, a brake system outputting a signal for indicating when the brake system is being commanded to a brake torque providing state, and a trailer brake controller coupled to the speed-sensing device and the brake system. The trailer brake controller utilizes the signal of the speed-sensing device to determine when the vehicle is in a zero-velocity state and utilizes the signal of the brake system to determine when the brake system is being commanded to the brake torque providing state. The trailer brake controller transitions a brake-actuating output signal thereof from a speed-dependent zero-velocity output signal value to a trailer hold zero-velocity output signal value greater than the speed-dependent zero-velocity output signal value when it is determined that the brake system is in the brake torque providing state while the vehicle is in the zero-velocity state.

15 Claims, 3 Drawing Sheets

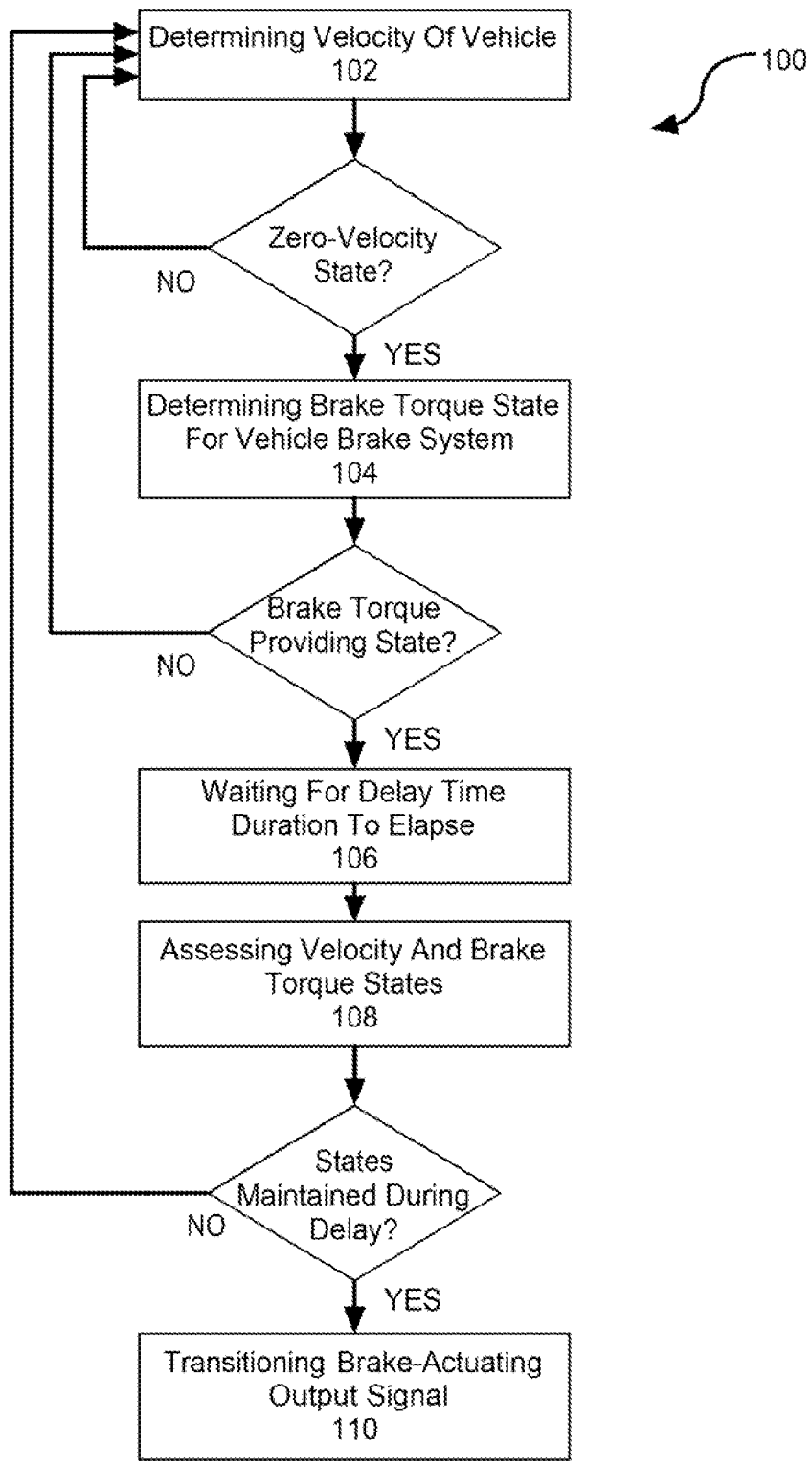

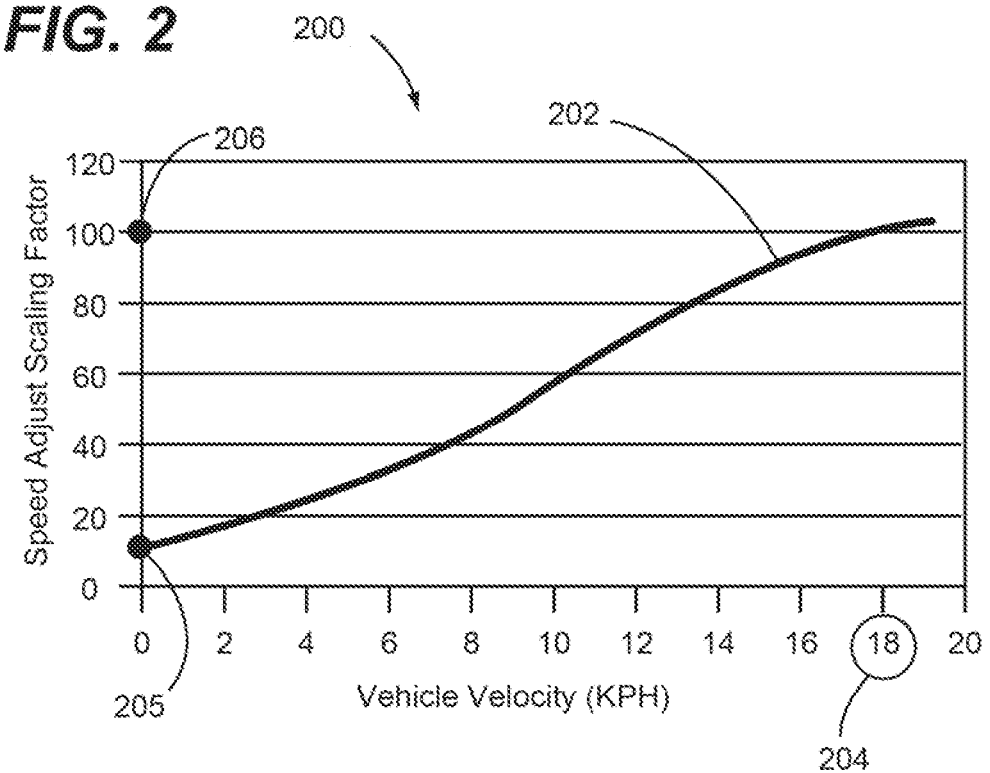
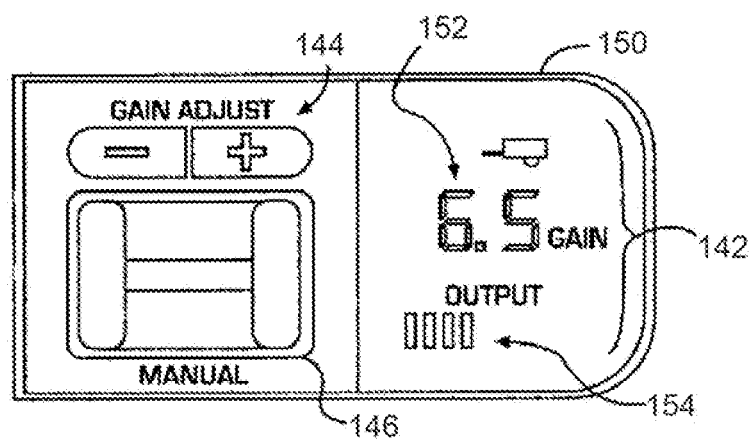

TRAILER HOLD ASSIST DURING STANDSTILL

FIELD OF THE DISCLOSURE

The disclosures made herein relate generally to trailer brake controllers and, more particularly, to configuring a trailer brake controller for enhancing a manner in which a brake system of the trailer contributes to holding the tow vehicle/trailer combination at a standstill.

BACKGROUND

Passenger vehicle transport capacity is an important design aspect of modern vehicles. The ability to haul objects and equipment is often as important as the vehicle's ability to transport additional passengers. Solutions aimed at increasing a vehicle's hauling capabilities must not only be directed at improving the vehicle's utility but must also be directed towards improving a vehicle's safety and performance while accomplishing this task. One traditional approach towards improving a vehicle's transport capabilities has been through the addition of a trailer attached to the vehicle. Trailers allow for a wide range of items to be transported by a vehicle, often without impacting transport capabilities of the vehicle's passenger compartment.

Where a passenger vehicle serves as a tow vehicle, trailer braking is often controlled through the use of a trailer brake controller located within the tow vehicle. The trailer is commonly equipped with a brake system that includes electrically actuated trailer brakes. A driver of the tow vehicle sets the gain on the trailer brake controller, where the gain dictates how much electrical output is generated by the trailer brake controller for a given set of vehicle inputs. The trailer brake controller utilizes a brake input signal in combination with the user set gain to generate a brake control signal. It is known that this signal can take different forms, such as a duty cycle output or DC voltage output. This control signal is sent to the trailer brake system via a wiring harness and is utilized by the trailer brake system to effectuate braking by the electrically actuated trailer brakes of the trailer brake system. Systems such as described translate vehicle input, such as brake pedal force or position, brake pressure or vehicle acceleration, into a brake control signal which is adjustable according to the operator set gain. The brake-actuating output signal, in turn, energizes the trailer brakes, which subsequently generates a braking torque on the trailer wheels.

Although the aforementioned systems can benefit from a lack of complexity, they fail to address the real world principles of mechanics that electrically actuated trailer brake assemblies are subject to. It is well-known that a brake torque desirable over a broad range of vehicle speeds can be undesirable at low vehicle speeds. At low vehicle speeds, electrically actuated braking systems, which are typically of the dual-servo drum type, generally exhibit a significant increase in effectiveness wherein an applied brake torque can result in the brakes locking up (also known as "grabbiness") rather than incrementally applying braking friction. To reduce the potential for such grabbiness at relatively low speeds, some known trailer brake controllers (i.e., conventional trailer brake controllers) are configured to provide a speed-dependent brake-actuating output signal when the tow vehicle slows below a certain speed. This speed-dependent brake-actuating output signal is intended to provide smooth braking (i.e., less grabbiness) at lower speeds. However, at standstill, implementation of a speed-dependent brake-actuating output signal in this manner results in the trailer brake controller providing less than maximum possible or desirable output, which can lead to the tow vehicle brakes having to exert an undesirable amount of brake torque to hold the tow vehicle/trailer at a standstill. Furthermore, in certain situations such as, for example, when at a standstill on an inclined surface, the reduced brake torque at the trailer resulting from the speed-dependent brake-actuating output signal can adversely impact the ability of the combined brake systems of the tow vehicle/trailer combination to provide sufficient or desirable brake torque to maintain the tow vehicle/trailer combination at a standstill.

Therefore, configuring speed-dependent brake-actuating output signal functionality of a trailer brake controller to provide a brake-actuating output signal that is in excess of a brake-actuating output signal of a conventional trailer brake controller when the vehicle is detected to be at a standstill and braking is being requested by the driver would be advantageous, desirable and useful.

SUMMARY OF THE DISCLOSURE

Embodiments of the present invention relate to configuring a trailer brake controller to enhance a manner in which a brake system of the trailer contributes to holding the tow vehicle/trailer combination at a standstill when the tow vehicle/trailer combination is in a zero-velocity state (i.e., is at a standstill). More specifically, embodiments of the present invention cause a trailer brake controller of the tow vehicle to increase an amount of brake torque at brakes of the trailer while an operator of the tow vehicle is requesting braking when the tow vehicle/trailer combination is at a standstill. In doing so, by increasing the amount of brake torque applied to by the trailer brakes when the tow vehicle/trailer combination is at a standstill and, embodiments of the present invention advantageously overcomes one or more shortcomings associated with conventional trailer brake controllers that provide a speed-dependent brake-actuating output signal.

In one embodiment of the present invention, a method is provided for controlling a trailer brake system of a trailer using a trailer brake controller of a tow vehicle to which the trailer is attached. The method includes determining that the tow vehicle is in a zero-velocity state, determining that a brake system of the tow vehicle is in a brake torque providing state while the tow vehicle is in the zero-velocity state, and causing a brake-actuating output signal of the trailer brake controller to transition from a speed-dependent zero-velocity output signal value to a trailer hold zero-velocity output signal value greater than the speed-dependent zero-velocity output signal value. Causing the brake-actuating output signal transition is performed in response to determining that the brake system is in the brake torque providing state while the tow vehicle is in the zero-velocity state.

In another embodiment of the present invention, a vehicle comprises a speed-sensing device outputting a signal indicating a velocity of the vehicle, a brake system outputting a signal for indicating when the brake system is being commanded to a brake torque providing state, and a trailer brake controller coupled to the speed-sensing device and to the brake system. The trailer brake controller utilizes the signal of the speed-sensing device to determine when the vehicle is in a zero-velocity state and utilizes the signal of the brake system to determine when the brake system is being commanded to the brake torque providing state. The trailer brake controller transitions a brake-actuating output signal thereof from a speed-dependent zero-velocity output signal value to a trailer hold zero-velocity output signal value greater than the speed-dependent zero-velocity state output signal value when it is determined that the brake system is in the brake torque providing state while the vehicle is in the zero-velocity state.

In another embodiment of the present invention, a trailer brake controller comprises a signal input interface, a signal output interface, and a control module coupled to the signal input interface and the signal output interface. The signal input interface is configured for receiving a signal indicating a velocity of a vehicle and for receiving a signal indicating when a brake system of the vehicle is being commanded to a brake torque providing state. The control module receives the velocity indicating signal and the brake torque indicating signal from the signal input interface. The control module utilizes the velocity indicating signal to determine when the vehicle is in a zero-velocity state, utilizes the brake torque indicating signal to determine when the brake system is being commanded to the brake torque providing state, and determines a brake-actuating output signal as a function of the velocity indicating signal. When it is determined that the brake system is in the brake torque providing state while the vehicle is in a zero-velocity state, the control module transitions the brake-actuating output signal from a speed-dependent zero-velocity output signal value to a trailer hold zero-velocity output signal value greater than the speed-dependent zero-velocity output signal value. The signal output interface is configured for providing the brake-actuating output signal to a trailer brake system.

These and other objects, embodiments, advantages and/or distinctions of the present invention will become readily apparent upon further review of the following specification, associated drawings and appended claims.

BRIEF DESCRIPTION OF THE DRAWINGS

FIG. 1 is a flow chart view showing a method for controlling a trailer brake system in accordance with an embodiment of the present invention.

FIG. 2 is a diagrammatic view showing a speed-dependent output signal function configured in accordance with an embodiment of the present invention.

FIG. 4 is an illustrative view of a user interface of the trailer brake control electronic control unit shown in FIG. 3.

DETAILED DESCRIPTION OF THE DRAWING FIGURES

Figure 3:
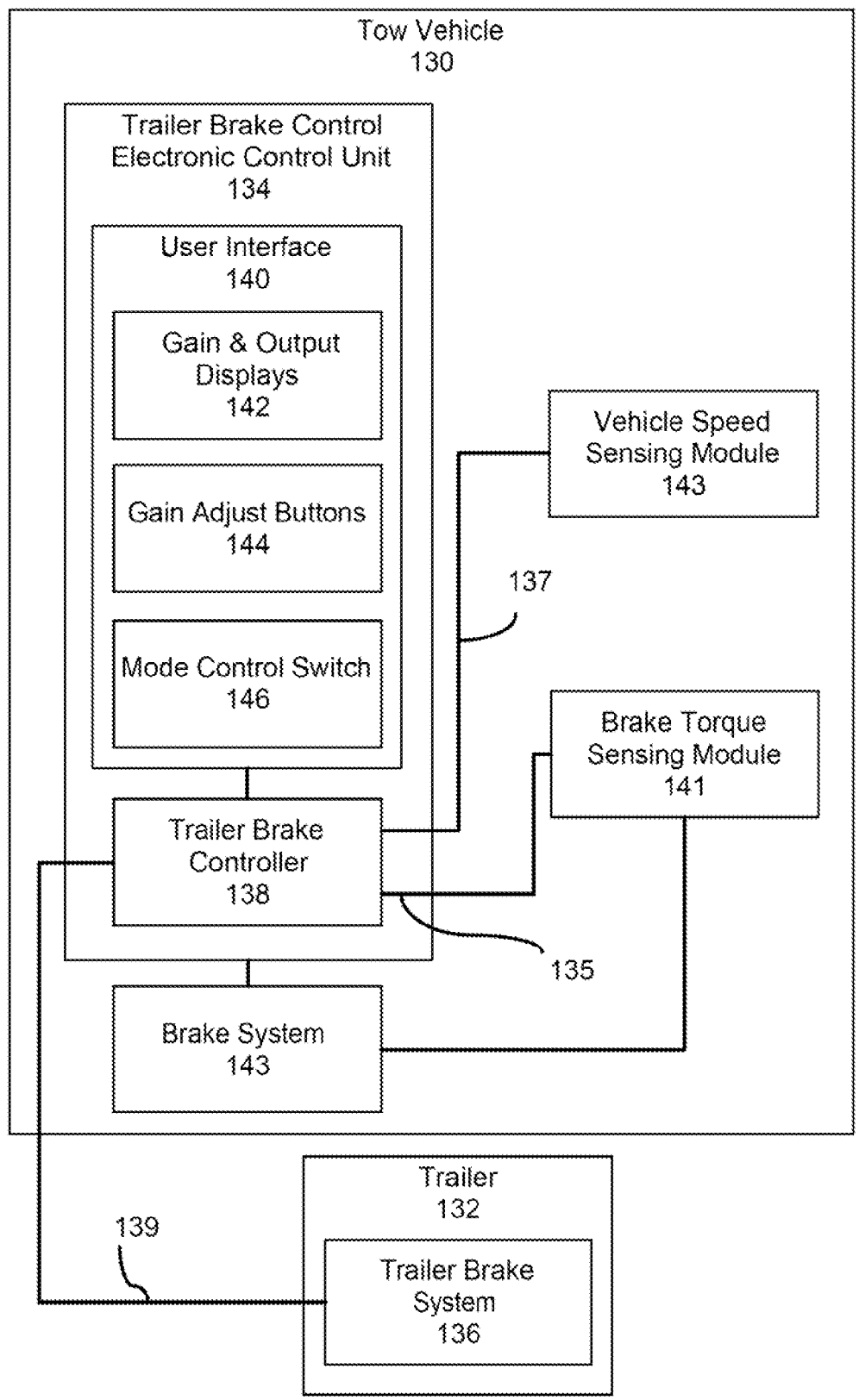
FIG. 3 is a block diagram showing a tow vehicle/trailer system configured in accordance with an embodiment of the present invention.

FIG. 1 shows a method 100 for controlling a trailer brake system of a trailer using a trailer brake controller of a tow vehicle to which the trailer is attached. Advantageously, the method 100 enhances a manner in which a brake system of the trailer contributes to holding the tow vehicle/trailer combination at a zero-velocity state (i.e., is at a standstill). More specifically, the method 100 causes a trailer brake controller of the tow vehicle to increase an amount of brake torque at the brakes of the trailer while an operator of the tow vehicle is requesting braking when the tow vehicle/trailer combination is at the zero-velocity state. In this manner, the brake system of the trailer assists the brake system of the tow vehicle in holding the tow vehicle/trailer combination at the zero-velocity state. Trailer is defined herein to include a vehicle that is being towed.

The method 100 begins with an operation 102 for determining a velocity (i.e., road speed) of the vehicle. If it is determined that the tow vehicle is not in the zero-velocity state the operation 102 is repeated such as, for example, by sampling a wheel speed signal that is being continuously generated and provided to one or more control modules and/or computers of the tow vehicle. Techniques for determining the velocity of a vehicle are well known. Examples of such techniques include, but are not limited to, using a GPS signal to determine vehicle velocity, using a wheel speed sensor to determine vehicle velocity, using wheel movement sensor information from an anti-lock brake system, or using a transmission output shaft sensor to determine vehicle velocity, and the like. It is disclosed herein that embodiments of the present invention are not unnecessarily limited to any particular approach for determining vehicle velocity.

If it is determined that the vehicle is in a zero-velocity state, an operation 104 is performed for determining a brake torque state of the tow vehicle brake system. A key trailer brake controller output trigger condition (e.g., when in automatic control mode) is a driver of the vehicle depressing the brake pedal of the tow vehicle to command the brake system of the vehicle to a brake torque providing state. In the brake torque providing state, brake assemblies at a plurality of the wheel hubs of the tow vehicle physically apply a brake torque for decelerating the tow vehicle and, once decelerated to a standstill, holding the tow vehicle at the standstill (i.e., holding the tow vehicle in a zero-velocity state). Examples of sensing the driver commanding the tow vehicle brake system to the brake torque providing state include, but are not limited to, using a signal provided by a master cylinder of the tow vehicle brake system to detect hydraulic line pressure and/or brake pedal movement, to using a signal from a brake electronic control module to detect hydraulic line pressure and/or brake pedal movement, and the like.

If it is determined that the tow vehicle brake system is not in a brake torque providing state, the method returns to the operation 102 for determining the vehicle velocity (i.e., starting another instance of the method 100). If it is determined that the tow vehicle brake system is in a brake torque providing state, an operation 106 is performed for waiting for a delay time duration to elapse, followed by an operation 108 being performed for assessing the vehicle velocity and brake torque states. In certain embodiments of the present invention, determining the brake torque state of the tow vehicle brake system can include determining an amount (e.g., estimated or calculated) of brake torque being commanded by a driver of the vehicle. Examples of determining the amount of brake torque being commanded by the driver of the vehicle include, but are not limited to, determining such amount using a signal provided by a master cylinder of the tow vehicle brake system corresponding to hydraulic line pressure and/or brake pedal movement and determining such amount using a signal from a brake electronic control module corresponding to hydraulic line pressure and/or brake pedal movement. Accordingly, in such embodiments, assessing the brake torque state can include assessing whether at least a prescribed amount of brake torque has been commanded during a particular portion of the delay time (e.g., an entire portion of the delay time or a fractional portion of the delay time).

The delay time is a variable value calibrated to a particular value. In preferred embodiments, the delay time will be greater than zero to allow for the tow vehicle and the trailer to become settled after coming to stop (e.g., debounced through dissipation of inertial energy). However, it is disclosed herein that, in other embodiments the delay time can be set to zero, thereby causing the operation 108 for assessing the vehicle velocity and brake torque states to be performed immediately after determining that the tow vehicle brake system is in the brake torque providing state when the tow vehicle is in the zero-velocity state. It is also disclosed herein that separate delay times can be used in association with assessing the vehicle velocity state and the brake torque state. In some embodiments, such separate delay times can be of equal duration and run concurrently. In other embodiments, such separate delay times can be of different duration and start and/or elapse at different points in time.

If such assessment of the vehicle velocity and brake torque states finds that a required vehicle velocity state and a required brake torque state have not been maintained during the duration of the delay time, the method continues at the operation 102 for determining the vehicle velocity (i.e., starting another instance of the method 100). Otherwise, an operation 110 is performed for transitioning a brake-actuating output signal of a trailer brake controller of the tow vehicle from a speed-dependent zero-velocity output signal value to a trailer hold zero-velocity output signal value that is greater than the speed-dependent zero-velocity output signal value. It is through such transitioning that a trailer brake controller of the tow vehicle can increase an amount of brake torque at the brakes of the trailer while an operator of the tow vehicle is requesting braking while the tow vehicle/trailer combination is in the zero-velocity state (i.e., at a standstill).

FIG. 2 shows a brake-actuating output signal function 200 configured in accordance with an embodiment of the present invention. Prior to the tow vehicle/trailer combination discussed in reference to the method 100 of FIG. 1 being determined to be at a standstill in a brake torque providing state for the required time delay, a trailer brake controller of the vehicle outputs the brake-actuating output signal in accordance with the speed adjust scaling factor calibration curve 202 when the tow vehicle is moving less than about 18 mph (i.e., the tow vehicle moving slower than a prescribed tow vehicle velocity 204). As can be seen, the speed adjust scaling factor calibration curve 202 provides for a brake-actuating output signal value (i.e., speed adjust scaling factor) corresponding to the zero KPH vehicle velocity (i.e., the speed-dependent zero-velocity output signal value 205) that is significantly less than the brake-actuating output signal value corresponding to the prescribed tow vehicle velocity 204. In this regard, outputting the brake-actuating output signal in accordance with the speed adjust scaling factor calibration curve 202 provides the beneficial functionality of smoothing trailer braking (i.e., less grabbiness) at lower speeds. A value of the brake-actuating output signal can be applied to a trailer brake actuation parameter (e.g., multiplied with a duty cycle value corresponding to specified brake input gain value), thereby dictating an amount of brake torque provided by the trailer brake system.

In contrast to prior art implementations of trailer brake controllers, the present invention results in a value of the brake-actuating output signal being increased to the trailer hold zero-velocity output signal value 206 after it is determined that the required vehicle velocity state and required brake torque state have been maintained during the duration of the delay time. This transition from the speed-dependent zero-velocity output signal value 205 to the trailer hold zero-velocity output signal value 206 advantageously results in the trailer brake controller causing an increased amount of brake torque to be applied by the trailer brakes when the tow vehicle has been is in the zero-velocity state with its brake system in the brake torque providing state for the prescribed time delay. This increased amount of brake torque by the trailer brakes enhances the manner in which the brake system of the trailer contributes to holding the tow vehicle/trailer combination at a standstill.

From the foregoing discussion a skilled person will appreciate that trailer brake hold assist functionality in accordance with the present invention can be implemented upon an ignition of a vehicle being activated (e.g., an ignition switch being turned to or past an ignition-on position). For example, in reference to FIG. 2, upon the ignition of the vehicle being activated while the vehicle is at a standstill, a trailer brake controller of the vehicle can be configured to output a brake-actuating output signal having the trailer hold zero-velocity output signal value 206 as opposed to the speed-dependent zero-velocity output signal value 205. In this regard, the trailer brakes would apply an increased amount of brake torque even though the vehicle/trailer combination has not yet been driven since the ignition having been activated. Such an embodiment of the present invention is useful in that it enhances trailer-provided brake torque upon the vehicle's ignition being activated. In conjunction with such an implementation of trailer brake hold assist functionality, a skilled person will also appreciate that a parking brake of a vehicle being engaged and/or a transmission of a vehicle being in a park position are examples of the vehicle being in a brake-torque providing state.

Referring now to FIG. 3, a tow vehicle 130 configured in accordance with an embodiment of the present invention is shown having a trailer 132 attached thereto (e.g., physically connected via a trailer hitching structure and electrically connected via a wiring harness). Integrated into the tow vehicle 130 is a trailer brake control electronic control unit 134. As will be discussed below in greater detail, the trailer brake control electronic control unit 134 allows an applied brake torque of a trailer brake system 136 (i.e., electrically actuated trailer brakes thereof) of the trailer 132 to be selectively adjusted by a driver of the tow vehicle 130. More specifically, in accordance with the present invention, the trailer brake control electronic control unit 134 allows a brake-actuating output signal of the brake control electronic control unit 134, which actuates trailer brake system 136, to be automatically transitioned from a speed-dependent zero-velocity output signal value to a trailer hold zero-velocity output signal value. An applied brake torque corresponding to the trailer hold zero-velocity output signal value is greater than a brake torque corresponding to the speed-dependent zero-velocity output signal value. In this regard, the trailer brake control electronic control unit 134 (i.e., trailer brake controller thereof) is configured allowing the trailer brake system 136 of the trailer 132 to offer greater assistance in holding the tow vehicle 130 and trailer 132 at a standstill.

The trailer brake control electronic control unit 134 includes a trailer brake controller 138 having a braking signal input 135 and a vehicle speed input 137. Through use of signals from the braking signal input interface 135 and the vehicle speed signal input interface 137, the trailer brake controller 138 carries out brake-actuating output signal control functionality as disclosed above in reference to the method 100 of FIG. 1. A brake control output signal from the trailer brake controller 108 is provided to the trailer brake system 136 via a signal output interface 139. It is contemplated herein that signals provided to the braking signal input interface 135 and the vehicle speed input interface 137 can be supplied by a variety of sources of the tow vehicle 130. For example, in one embodiment, it is contemplated that the signal to the braking signal input interface 135 and the signal to the vehicle speed input interface 137 are provided via communication with a brake torque state sensing module 141 and a vehicle speed sensing module 143, respectively. Any module of the tow vehicle 130 that is capable of providing a suitably configured signal for indicating that a brake system 143 of the tow vehicle 130 is in a brake torque providing state (e.g., depressing of brake pedal detected, hydraulic line pressure detected, an estimated amount of hydraulic line pressure sensed/calculated, etc) is an example of the brake torque state sensing module 141. Similarly, any module of the tow vehicle 130 that is capable of providing a suitably configured signal for indicating a velocity (i.e., speed) of the tow vehicle 130 to the trailer brake controller 138 is an example of the vehicle speed sensing module 143.

Referring now to FIGS. 3 and 4, the trailer brake control electronic control unit 104 includes a user interface 140 that allows a magnitude of an electric control signal (e.g., a duty cycle value) provided from the trailer brake controller 108 to the trailer brake system 106 to be manually adjusted (i.e., manual control mode) or automatically managed by the trailer brake controller (i.e., automatic control mode). In preferred embodiments of the present invention, the functionality of automatically transitioning a brake-actuating output signal of the brake control electronic control unit 104 from a speed-dependent zero-velocity output signal value to a trailer hold zero-velocity output signal value (i.e., trailer brake hold assist functionality) is retained even when in the manual control mode. For example, the trailer hold zero-velocity output signal value can be a preset value independent of such user adjustment or can be a function of such user adjustment (e.g., proportional to a manual adjustment, but never equal to zero). In this manner, embodiments of the present invention, allow for the combination of driver adjustability of trailer brake torque and trailer brake hold assist. However, it is disclosed herein that a trailer brake controller can be configured such that trailer brake hold assist functionality is enabled only when the trailer brake control electronic control unit 104 is in the automatic control mode.

The user interface 140 includes a visual display 142, a user control input 144 (e.g., a gain input control) and a control mode switch 146. Jointly, the visual display 142, the user control input 144, and the override switch 146 represent user interface elements that can be adapted and complemented to provide a range of communication and control to a driver of the tow vehicle 100. The display 142 can include a gain display 152 and a signal strength display 154. The signal strength display 154 allows the driver of the tow vehicle 100 to quantitatively and/or qualitatively visualize a magnitude of the trailer brake output signal 118 and adjust the gain input control 144 to suit individual preferences. The control mode switch 146 can be operated by the driver of the tow vehicle 100 to selectively enable a desired mode of operation of the trailer brake controller such as for example the automatic control mode and the manual control mode. A mode allowing for the trailer brake controller to automatically adjust parameters for affecting (e.g., optimizing to road conditions and vehicle operating conditions) the trailer brake output signal 118 is an example of the automatic control mode. A mode allowing the driver of the vehicle to manually adjust parameters for affecting (e.g., optimizing to driver preference) the trailer brake output signal 118 is an example of the manual control mode.

Referring now to instructions processible by a data processing device, it will be understood from the disclosures made herein that methods, processes and/or operations adapted for carrying out trailer brake hold assist functionality as disclosed herein are tangibly embodied by non-transitory computer readable medium having instructions thereon that are configured for carrying out such functionality. In one specific embodiment, the instructions are tangibly embodied for carrying out the method 100 disclosed above in reference to FIG. 1. The instructions can be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out trailer brake hold assist functionality in accordance with the present invention.

In a preferred embodiment of the present invention, a trailer brake controller comprises such a data processing device, such a non-transitory computer readable medium, and such instructions on the computer readable medium for carrying out trailer brake hold assist functionality (e.g., in accordance with the method 100 discussed above in reference to FIG. 1). To this end, the trailer brake controller can comprise a signal input interface (e.g., the braking signal input interface 135 and the vehicle speed input interface 137 of FIG. 3), a signal output interface (e.g., the signal output interface 139 of FIG. 3), and a control module (e.g., the control module 138 of FIG. 3) coupled to the signal input interface and the signal output interface. The signal input interface can be configured for receiving a signal indicating a velocity of a vehicle and for receiving a signal indicating when a brake system of the vehicle is being commanded to a brake torque providing state. The control module can include the data processing device, the non-transitory computer readable medium, and the instructions. The control module can be configured to receive the velocity indicating signal and the brake torque indicating signal from the signal input interface. The control module can be configured to utilize the velocity indicating signal to determine when the vehicle is in a zero-velocity state, to utilize the brake torque indicating signal to determine when the brake system is being commanded to the brake torque providing state, and to determine a brake-actuating output signal as a function of the velocity indicating signal. When it is determined that the brake system is in the brake torque providing state while the vehicle is in a zero-velocity state, the control module can be configured to transition the brake-actuating output signal from a speed-dependent zero-velocity output signal value to a trailer hold zero-velocity output signal value greater than the speed-dependent zero-velocity output signal value. The signal output interface can be configured for providing the brake-actuating output signal to a trailer brake system.

A trailer brake controller in the context of the present invention can be any controller that provides for trailer brake hold assist functionality in accordance with the present invention. Furthermore, it is disclosed herein that such a controller can be implemented within a standalone controller unit (physically and logically) or can be implemented logically within two or more separate but interconnected controller units. In one example, trailer brake hold assist functionality in accordance with the present invention is implemented within a standalone controller unit that provides only trailer brake control functionalities, which includes trailer brake hold assist functionality. In another example, trailer brake hold assist functionality in accordance with the present invention is implemented within a standalone controller unit that provides trailer brake hold assist functionality as well as one or more other types of system control functionality (e.g., anti-lock brake system functionality) of a vehicle. In still another example, trailer brake hold assist functionality in accordance with the present invention is implemented logically in a distributed manner whereby a plurality of control units, control modules, computers, or the like jointly carry out operation for providing such trailer brake hold assist functionality. Similarly, a control module of a trailer brake controller that carries out operations for providing trailer brake hold assist functionality in accordance with the present invention can be a standalone module structure (physically and logically) or a distributed module structure that is physically comprised of a plurality of discrete module structures that jointly carry out respective portions of logic for providing trailer brake hold assist functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of controlling a trailer brake system of a trailer using a trailer brake controller of a tow vehicle to which the trailer is attached, comprising:
   determining that the tow vehicle is in a zero-velocity state for a first prescribed duration of time associated with the zero-velocity state;
   waiting for a delay time duration to elapse;
   determining that a brake system of the tow vehicle is in a brake torque providing state for a second prescribed duration of time after at least a portion of the delay time duration has elapsed and while the tow vehicle is in the zero-velocity state, the second prescribed duration of time is associated with the brake torque providing state and is distinct from the first prescribed duration of time associated with the zero-velocity state; and
   causing a brake-actuating output signal of the trailer brake controller to transition from a speed-dependent zero-velocity output signal value to a trailer hold zero-velocity output signal value greater than the speed-dependent zero-velocity output signal value, wherein causing the brake-actuating output signal transition is performed in response to determining that the brake system is in the brake torque providing state for the second prescribed duration of time while the tow vehicle is in the zero-velocity state for the first prescribed duration of time.

2. The method of claim 1 wherein:
   determining that the brake system is in the brake torque providing state includes determining that the brake system is providing at least a prescribed amount of brake torque during the second prescribed duration of time while the tow vehicle is in the zero-velocity state; and
   causing the brake-actuating output signal of the trailer brake controller to transition from the speed-dependent zero-velocity output signal value to the trailer hold zero-velocity output signal value is performed in response to determining that the tow vehicle has been in the zero-velocity state for the first prescribed duration of time and that the brake system is providing at least the prescribed amount of brake torque during the second prescribed duration of time while the tow vehicle is in the zero-velocity state.

3. The method of claim 1 wherein:
   the first duration of time is equal to the second duration of time; and
   the first duration of time runs concurrent with the second duration of time.

4. The method of claim 1 wherein:
   below a prescribed tow vehicle velocity, the brake-actuating output signal of the trailer brake controller is a function of a current velocity of the tow vehicle; and
   a value of the brake-actuating output signal at the prescribed tow vehicle velocity is substantially greater than the speed-dependent zero-velocity output signal value.

5. The method of claim 4 wherein the trailer hold zero-velocity output signal value is equal to or greater than the value of the brake-actuating output signal at the prescribed tow vehicle velocity.

6. A vehicle, comprising:
   a speed-sensing device outputting a signal indicating a velocity of the vehicle;
   a brake system outputting a signal for indicating when the brake system is being commanded to a brake torque providing state;
   a trailer brake controller coupled to the speed-sensing device and to the brake system, wherein the trailer brake controller utilizes the signal of the speed-sensing device to determine when the vehicle is in a zero-velocity state for a first prescribed duration of time, waits for a delay time duration to elapse, utilizes the signal of the brake system to determine when the brake system is being commanded to the brake torque providing state for a second prescribed duration of time after at least a portion of the delay time duration has elapsed, and transitions a brake-actuating output signal thereof from a speed-dependent zero-velocity output signal value to a trailer hold zero-velocity output signal value greater than the speed-dependent zero-velocity output signal value when it is determined that the brake system is in the brake torque providing state for the second prescribed duration of time while the vehicle is in the zero-velocity state for the first prescribed duration of time, the first and second durations of time are distinct from each other as the first prescribed duration of time is associated with the zero-velocity state and the second prescribed duration of time is associated with the brake-actuating output signal.

7. The vehicle of claim 6 wherein:
   the signal of the brake system provides an indication of an amount of brake torque being commanded; and
   the trailer brake controller transitions the brake-actuating output signal from the speed-dependent zero-velocity output signal value to the trailer hold zero-velocity output signal value when it is determined by the trailer brake controller that the vehicle has been in the zero-velocity state for the first prescribed duration of time and that the brake system has been commanded to provide at least a prescribed amount of brake torque during the second prescribed duration of time while the vehicle is in the zero-velocity state.

8. The vehicle of claim 7 wherein:
   the first duration of time is equal to the second duration of time; and
   the first duration of time runs concurrent with the second duration of time.

9. The vehicle of claim 6 wherein:
   below a prescribed vehicle velocity, the brake-actuating output signal is a function of a current velocity of the vehicle; and a value of the brake-actuating output signal at the prescribed vehicle velocity is substantially greater than the speed-dependent zero-velocity output signal value.

10. The vehicle of claim 9 wherein the trailer hold zero-velocity output signal value is equal to or greater than the value of the brake-actuating output signal at the prescribed vehicle velocity.

11. A trailer brake controller, comprising:

a signal input interface for receiving a signal indicating a velocity of a vehicle and for receiving a signal indicating when a brake system of the vehicle is being commanded to a brake torque providing state;

a control module coupled to the signal input interface for receiving the velocity indicating signal and the brake torque indicating signal therefrom, wherein the control module utilizes the velocity indicating signal to determine when the vehicle is in a zero-velocity state for a first prescribed duration of time, waits for a delay time duration to elapse, utilizes the brake torque indicating signal to determine when the brake system is being commanded to the brake torque providing state for a second prescribed duration of time, determines a brake-actuating output signal as a function of the velocity indicating signal, and transitions the brake-actuating output signal from a speed-dependent zero-velocity output signal value to a trailer hold zero-velocity output signal value greater than the speed-dependent zero-velocity output signal value when it is determined that the brake system is in the brake torque providing state for the second prescribed duration of time while the vehicle is in a zero-velocity state for the first prescribed duration of time, the first and second durations of time are distinct from each other as the first prescribed duration of time is associated with the zero-velocity state and the second prescribed duration of time is associated with the brake-actuating output signal; and a signal output interface coupled to the control module for providing the brake-actuating output signal to a trailer brake system.

12. The trailer brake controller of claim 11 wherein:

the control module utilizes the brake torque indicating signal to estimate an amount of brake torque being commanded by a driver of the vehicle; and the control module transitions the brake-actuating output signal from the speed-dependent zero-velocity output signal value to the trailer hold zero-velocity output signal value when it is determined by the control module that the vehicle has been in the zero-velocity state for the first prescribed duration of time and that the brake system has been commanded to provide at least a prescribed amount of brake torque during the second prescribed duration of time while the vehicle is in the zero-velocity state.

13. The trailer brake controller of claim 12 wherein:

the first duration of time is equal to the second duration of time; and the first duration of time runs concurrent with the second duration of time.

14. The brake controller of claim 11 wherein:

below a prescribed vehicle velocity, the brake-actuating output signal is a function of a current velocity of the vehicle; and a value of the brake-actuating output signal at the prescribed vehicle velocity is substantially greater than the speed-dependent zero-velocity output signal value.

15. The trailer brake controller of claim 14 wherein the trailer hold zero-velocity output signal value is equal to or greater than the value of the brake-actuating output signal at the prescribed vehicle velocity.

* * * * *